(12) United States Patent
Nishida et al.

(10) Patent No.: US 11,008,038 B2
(45) Date of Patent: May 18, 2021

(54) STEERING ASSIST SYSTEM

(71) Applicants: Toyota Jidosha Kabushiki Kaisha, Toyota Aichi-ken (JP); JTEKT Corporation, Osaka Osaka (JP)

(72) Inventors: Takeshi Nishida, Nagoya Aichi-ken (JP); Tsuyoshi Ikeda, Chiryu Aichi-ken (JP)

(73) Assignees: Toyota Jidosha Kabushiki Kaisha, Toyota (JP); JTEKT Corporation, Osaka (JP)

( * ) Notice: Subject to any disclaimer, the term of this patent is extended or adjusted under 35 U.S.C. 154(b) by 270 days.

(21) Appl. No.: 16/272,355

(22) Filed: Feb. 11, 2019

(65) Prior Publication Data

US 2019/0248409 A1    Aug. 15, 2019

(30) Foreign Application Priority Data

Feb. 12, 2018    (JP) .............................. JP2018-022642

(51) Int. Cl.
| | | |
|---|---|---|
| *B62D 5/06* | (2006.01) | |
| *B62D 5/065* | (2006.01) | |
| *B62D 5/10* | (2006.01) | |
| *B62D 5/04* | (2006.01) | |
| *B62D 5/20* | (2006.01) | |
| *B62D 5/09* | (2006.01) | |

(52) U.S. Cl.
CPC ............. *B62D 5/064* (2013.01); *B62D 5/046* (2013.01); *B62D 5/065* (2013.01); *B62D 5/10* (2013.01); *B62D 5/09* (2013.01); *B62D 5/20* (2013.01)

(58) Field of Classification Search
CPC ........ B62D 5/064; B62D 5/046; B62D 5/065; B62D 5/10; B62D 5/09; B62D 5/20
USPC ......................................................... 903/930
See application file for complete search history.

(56) References Cited

FOREIGN PATENT DOCUMENTS

| | | |
|---|---|---|
| CN | 103448792 A | 12/2013 |
| CN | 104085445 A | 10/2014 |
| JP | H068840 A | 1/1994 |
| JP | H8301132 | 11/1996 |
| JP | 3218788 B2 | 10/2001 |
| JP | 2014-019290 A | 2/2014 |

*Primary Examiner* — Minnah L Seoh
*Assistant Examiner* — Sophia Marie McGuire
(74) *Attorney, Agent, or Firm* — Dinsmore & Shohl LLP (57) ABSTRACT

A vehicle steering assist system, including an engine pump, a flow-rate restricting mechanism, a motor pump, a motor-pump controller, and a steering-force assist device, wherein the steering assist system is configured to restrict an engine-pump ejection flow rate to be lower than a required receiving flow rate to be received by the assist device when the engine pump is operated by being driven by an engine rotating at an idling speed, the engine-pump ejection flow rate being a flow rate of a working fluid ejected from the engine pump to the assist device via the restricting mechanism, and wherein the motor-pump controller is configured to control a motor-pump ejection flow rate such that an insufficient flow rate of the working fluid is covered by the motor-pump ejection flow rate, the insufficient flow rate being a shortage in the required receiving flow rate not covered by the engine-pump ejection flow rate.

11 Claims, 6 Drawing Sheets

STEERING ASSIST SYSTEM

CROSS REFERENCE TO RELATED APPLICATION

The present application claims priority from Japanese Patent Application No. 2018-022642, which was filed on Feb. 12, 2018, the disclosure of which is herein incorporated by reference in its entirety.

BACKGROUND

Technical Field

The following disclosure relates to a steering assist system configured to be installed on, a vehicle and to assist steering of wheels of the vehicle.

Description of Related Art

A hydraulic steering assist system to assist a steering three by a pressure of a working fluid (such as working oil) is proposed as a steering assist system. The hydraulic steering assist system is highly reliable and generates a relatively large assist force. The hydraulic steering assist system is typically configured such that a pump, as a high-pressure fluid source, is driven by rotation of an engine. In consideration of hybrid vehicles, it is desired that the steering force be assisted in a period in which the engine is not operating. In view of this, a steering assist system as disclosed in Japanese Patent Application Publication No. 2014-19290 is proposed, for instance. The steering assist system includes an engine pump driven by rotation of an engine and a motor pump driven by rotation of an electric motor. The steering assist system is configured such that the working fluid ejected from the engine pump and the working fluid ejected from the motor pump are received by an assist device configured to assist the steering force. (Hereinafter, such a steering assist system will be referred to as "two-pump hydraulic steering assist system" where appropriate.)

SUMMARY

The two-pump hydraulic steering assist system described above is still under development, and the utility of the system is improved by making modifications to the system. Accordingly the present disclosure is directed to a steering assist system having high quality.

In one aspect of the disclosure, the steering assist system is the two-pump hydraulic steering assist system including a flow-rate restricting mechanism configured to restrict a flow rate of a working fluid ejected from the engine pump. In the steering assist system, when the engine drives the engine pump at the idling speed, the flow rate of the working fluid ejected from the engine pump via the flow-rate restricting mechanism is restricted to be lower than a flow rate of the working fluid to be received by the assist device. A shortage in the flow rate of the working fluid that cannot be covered by the flow rate of the working fluid ejected from the engine pump is covered by a flow rate of the working fluid ejected from the motor pump.

According to the steering assist system constructed as described above, an ejection hove rate of the working fluid ejected from the engine pump to the assist device when the engine is operating is restricted to be low, making it possible to downsize the engine pump, namely, to employ the engine pump whose pump volume (pump capacity) is small and to reduce the energy consumption. Because the operation of the engine pump causes a rise in the temperature of the working fluid, the downsizing of the engine pump is advantageous in suppressing the temperature rise. Thus, the steering assist system that enjoys such an advantage has high utility.

There will be exemplified and explained various forms of aspects of the present disclosure. Each of the forms is numbered like the appended claims and depends from the other form or forms, where appropriate. This is for easier understanding, of the aspects of the present disclosure, That is, it is to be understood that the aspects of the present disclosure shall be construed in the light of the following description of rations forms and embodiments. It is to be further understood that, as long as the aspects of the present disclosure are construed in this way, any form in which one or more constituent elements is/are added to or deleted from any one of the following forms may be considered as one form of aspects of the present disclosure.

(1) A steering assist system for a vehicle, including:
a reservoir storing a working fluid;
an engine pump configured to be driven by an engine that drives the vehicle and to pump up the working fluid stored in the reservoir so as to eject the working fluid at a flow rate in accordance with a rotational speed of the engine;
a flow-rate restricting mechanism configured to restrict the flow rate of the working fluid ejected from the engine pump;
an electric motor;
a motor pump configured to be driven by the electric motor and to pump up the working fluid stored in the reservoir so as to eject the working fluid;
a motor-pump controller configured to control a motor-pump ejection flow rate by controlling an operation of the electric motor, the motor-pump ejection flow rate being a flow rate of the working fluid ejected from the motor pump; and
an assist device configured to receive the working fluid ejected from the motor pump and the working fluid ejected from the engine pump via the flow-rate restricting mechanism and to assist a steering force by the received working fluid while returning the received working fluid to the reservoir,
wherein the steering assist system is configured such that an engine-pump ejection flow rate is restricted to be lower than a required receiving flow rate when the engine pump is operated by being driven by the engine that is rotating at an idling speed, the engine-pump ejection flow rate being a flow rate of the working fluid ejected from the engine pump to the assist device via the flow-rate restricting mechanism, the required receiving flow rate being a flow rate of the working fluid required to be received by the assist device, and
wherein the motor-pump controller is configured to control the motor-pump ejection flow rate such that an insufficient flow rate of the working fluid is covered by the motor-pump ejection flow rate, the insufficient flow rate being a shortage in the required receiving flow rate that cannot be covered by the engine-pump ejection flow rate.

This form is a basic form of the steering assist system according to the present disclosure. (The steering assist system will be hereinafter simply referred to as "assist system" where appropriate). The assist system according to the present disclosure is what is called two-pump hydraulic steering assist system including the engine pump driven by the engine and the motor pump driven by the electric motor and configured such that the assist device receives the working fluid ejected from the two pumps and assists the steering force in dependence on the received working fluid. In the engine pump of the assist system of this firm, the ejection flow rate of the working fluid increases substantially linearly in accordance with an increase in a rotational speed of the engine. When the engine is operating, the engine is rotating at a speed higher than or equal to the set idling speed, so that the engine pump ejects the working fluid at a flow rate higher than or equal to the set ejection flow rate. In the meantime, in the case where the present assist system is installed on a hybrid vehicle configured to be driven by both of the engine and the drive motor, the engine is stopped when the vehicle is driven only by the drive motor, so that the working fluid is not ejected from the engine pump. (Hereinafter, this mode will be referred to as "EV mode" or "EV running mode" where appropriate.) The present assist system is installable on a vehicle including only the engine as a drive source and configured to keep driving utilizing, the inertia of the vehicle while stopping the engine in the running state of the vehicle, namely, a vehicle capable of running in what is called idling stop mode in deceleration or inertial running mode. In the case where the present assist system is installed on such a vehicle, the engine is stopped when the vehicle is running by the inertia, so that the working fluid is not ejected from the engine pump.

For instance, an ordinary flow-rate restricting mechanism including valves, as described in Japanese Patent No. 3218788, Japanese Patent Application Publication No. 8-301132, or Japanese Patent Application Publication No. 6-8840, may be employed as the flow-rate restricting mechanism of this form. The flow-rate restricting mechanism may be mainly configured to restrict, to a certain extent, the flow rate of the working fluid ejected to the assist device even when the rotational speed of the engine becomes high. While the flow-rate restricting mechanism may be electronically controlled, the flow-rate restricting mechanism having not an electronic configuration but a mechanical configuration enables the system to be constructed inexpensively. The flow-rate restricting mechanism need not necessarily restrict the flow rate of the working fluid ejected from the engine pump to a constant flow rate. In the case where the pressure of the working fluid elected from the engine pump increases in accordance with an increase in the rotational speed of the engine, for instance, the flow-rate restricting mechanism may change, in steps or continuously, the flow rate of the working fluid passing therethrough in accordance with the pressure increase. Specifically, when the rotational speed of the engine increases to a certain extent, the flow-rate restricting mechanism may intentionally decrease the flow rate of the working fluid ejected to the assist device, so as to increase a load with respect to the operation of a steeling operation member, namely, so as to increase a force required for the operation of the steering operation member.

The assist device of this form may be configured to include (a) a hydraulic actuator configured to give, to a steering shaft, a steering rod, etc., of the steering system, a force to assist the steering force, i.e., an assist force, in accordance with the pressure of the working fluid that the actuator receives and (b) a supply-flow controlling mechanism configured to control the flow rate of the working fluid supplied to the actuator. An ordinary supply-flow controlling mechanism as illustrated in FIG. 2 of the Japanese Patent Application Publication No. 6-8840 may be employed, for instance. Specifically, there may be employed the supply-flow controlling mechanism configured to receive the working fluid ejected from at least one of the engine pump and the motor pump. In this supply-flow controlling mechanism, the working fluid is returned to the reservoir when the steering force is not being generated whereas a part of the received working fluid is supplied to the actuator at a flow rate in accordance with the steering when the steering force is being generated. For the assist device, the flow rate of the working fluid to be received by itself, namely, to be received by the supply-flow controlling mechanism, is set to generate an appropriate assist force. The set flow rate of the working fluid corresponds to the required receiving flow rate defined in this form.

In the assist system of this form, the flow rate of the working fluid ejected from the engine pump to the assist device via the flow-rate restricting mechanism, namely, the engine-pump ejection flow rate, is restricted to be lower than the required receiving flow rate when the rotational speed of the engine is equal to the idling speed. That is, by decreasing an ejection amount of the engine pump per one rotation, the engine-pump ejection flow rate is made lower than the required receiving flow rate in a low-speed engine operation state in which the rotational speed of the engine is relatively low, and the engine-pump ejection flow rate is made larger than the required receiving flow rate in a high-speed engine operation state in which the rotational speed of the engine is high to a certain extent. The thus constructed assist system enables the engine pump to be downsized, namely, enables employment of the engine pump whose pump capacity is small, and enables the energy consumption to be reduced.

Due to the restriction of the engine-pump ejection flow rate by the flow-rate restricting mechanism described above, however, the engine-pump ejection flow rate is not enough to cover the required receiving flow rate, causing a shortage in the required receiving flow rate that corresponds to a difference between the required receiving flow rate and the engine-pump ejection flow rate. (The shortage in the required receiving flow rate will be referred to as "insufficient flow rate" where appropriate.) In this case, it is expected that the assist device fails to generate a sufficient assist force. According to this form, the motor pump is operated even when the engine is operating, so as to cover or compensate for the insufficient flow rate by the working fluid ejected from the motor pump. That is, the insufficient flow rate is covered by the motor-pump ejection flow rate that is the flow rate of the working fluid ejected from the motor pump to the assist device.

Thus, this form enables construction of the assist system having a sufficient assist capability while downsizing the engine pump, and the constructed assist system has high utility. In the case where the insufficient flow rate is covered by the flow rate of the working fluid ejected from the motor pump, the entirety of the insufficient flow rate need not necessarily be covered. In other words, a part of the insufficient flow rate may be covered in consideration of downsizing of the electric motor and the motor pump, unless any practical problem is caused.

The operation of the engine pump increases the temperature of the working fluid. In particular, the flow-rate restricting mechanism, which restricts passage of the working fluid ejected from the engine pump, is a relatively big factor responsible for the temperature rise. As explained above, the present assist system may employ the small-sized engine pump, i.e., the engine pump whose output and energy consumption are relatively small, thus making it possible to suppress the temperature rise of the working fluid. The employment of such an engine pump suppresses the temperature rise of the working fluid in the flow-rate restricting mechanism that arises from the restriction described above. Accordingly, the downsizing of the engine pump, namely, the reduction in the pump capacity and the energy consumption, is effective for suppressing the temperature rise of the working fluid.

(2) The steering, assist system according to the form (1), wherein the motor-pump controller is configured to prohibit ejection of the working fluid from the motor pump in a situation in which a temperature of the working fluid is higher than or equal to a set temperature.

The electric motor has an operable temperature range lower than that of the engine pump. The electric motor itself generates heat by operating. Further, the motor-pump controller is constituted by a board on which a computer, drivers and the like are mounted and is accordingly heat-sensitive. Thus, the motor pump and the electric motor are desirably stopped operating in a situation in which the temperature of the working fluid is high to a certain extent. As later explained, in the case where the motor pump, the electric motor, and the motor-pump controller are installed on the vehicle as a unit for enhancing installation efficiency with respect to the vehicle, the degree of arise in the temperature of the unit becomes high when the temperature of the working fluid is high. It is therefore particularly desirable to stop operating the motor pump and the electric motor. In view of this, in the assist system of this form, the motor pump is prohibited from operating in the situation in which the temperature of the working fluid is higher than or equal to the set temperature.

The situation in which the temperature of the working fluid is higher than or equal to the set temperature means that the assist system is in a high-temperature situation. When the assist system is in the high-temperature situation, the temperature of the working fluid is high. In this form, the temperature of the working fluid is utilized, for convenience sake, as an indicator for representing the high-temperature situation. In other words, the temperature of any component of the assist system or any position in the assist system may be detected, and it may be determined that the assist system is in the high-temperature situation when the detected temperature is higher than or equal to a certain temperature. In this form, any component of the assist system or any position in the assist system for which the temperature is detected is not limited to a particular component or a particular position. For instance, it may be determined whether the assist system is in the situation in which the temperature of the working fluid is higher than or equal to the set temperature, namely, whether the assist system is in the high-temperature situation, based on a temperature detected by a temperature sensor for measuring the temperature of the working fluid at a specific position in a flow passage of the working fluid or a temperature detected by a temperature sensor of the motor-pump controller in the case where the motor-pump controller includes the temperature sensor for detecting its temperature. As described above, the motor-pump controller is heat-sensitive. Thus, a form in which the determination as to the high-temperature situation of the assist system is made based on the temperature detected by the temperature sensor provided in the motor-pump controller may be regarded as one form.

(3) The steering assist system according to the form (2), wherein the idling speed of the engine is increased in the situation.

In the case where the motor pump is prohibited from operating in the high-temperature situation, the required receiving flow rate cannot be covered by the engine-pump ejection flow rate at least when the engine is being driven at the set idling speed, due to the restriction by the flow-rate restricting mechanism described above. In this form, the idling, speed of the engine is increased to reduce the insufficient flow rate, in other words, to narrow a rotational speed range of the engine in which the insufficient flow rate is caused. In the case where an engine controller for controlling the idling speed is installed on the vehicle, the assist system may be configured such that a command to it the idling rotational speed is sent to the engine controller from the assist system, specifically, from the motor-pump controller of the assist system.

(4) The steering assist system according to the form (3), wherein the idling speed of the engine is increased in the situation to such an extent that the required receiving flow rate is covered by the engine-pump ejection flow rate at a time when the engine pump is operated by being driven by the engine that is rotating at the idling speed.

According to this form, even if the motor pump is not operated in the high-temperature situation, the insufficient flow rate described above is not caused, in other words, the required receiving flow rate can be covered by the engine-pump ejection flow rate, over an entire range of the rotational speed in which the engine, is operated. It is thus possible to adequately avoid a decrease in the assist capability of the steering force.

(5) The steering assist system according to any one of the forms (2) through (4), wherein, where the set temperature is a first set temperature, the ejection of the working fluid from the motor pump that has been prohibited is allowed when the temperature of the working fluid is lowered to less than a second set temperature that is set to be lower than the first set temperature by providing a margin.

The vehicle, which has been once placed in the high-temperature situation, gets out of the situation when the temperature of the working fluid is gradually lowered with a lapse of time. In an arrangement in which the operation of the motor pump is prohibited when the temperature of the working fluid becomes higher than or equal to the set temperature and the prohibited operation of the motor pump is allowed thereafter when the temperature of the working fluid becomes less than the same set temperature, it is expected that the operation of the motor pump is repeatedly prohibited and allowed if the temperature relatively slowly decreases, due to an influence of detection accuracy of the temperature sensor, noise generated upon detection, or the like. That is, there is a possibility of an occurrence of a hunting phenomenon in the control of the motor pump. According to this form, the temperature as a threshold for prohibiting the operation of the motor pump differs from the temperature as a threshold for allowing the operation of the motor pump, thus effectively preventing the hunting phenomenon. In the case where the idling speed of the engine is configured to increase in the high-temperature situation, the idling speed may be lowered back to the original value when the operation of the motor pump is allowed.

(6) The steering assist system according to any one of the forms (2) through (5), wherein the vehicle is a hybrid vehicle configured to be capable of being driven by both of the engine and a drive motor, and the vehicle is capable of being driven only by the drive motor, and wherein the vehicle is prohibited from being driven only by the drive motor in the situation.

In the case where the operation of the motor pump is prohibited in the high-temperature situation, the engine does not operate if the vehicle runs in the EV mode. In this case, the assist force is not obtained. Thus, the assist system of this form prohibits running of the vehicle in the EV mode when the operation of the motor pump is prohibited. The prohibited running of the vehicle in the EV mode may be allowed when the operation of the motor pump is allowed.

(7) The steering assist system according to any one of the forms (1) through (6), wherein the electric motor, the motor pump, and the motor-pump controller are installed on the vehicle as a unit.

According to this form, the electric motor, the motor pump, and the motor-pump controller are installed on the vehicle as one unit, and the installation efficiency of the assist system is accordingly high. In the unit, the electric motor and the motor-pump controller are likely to be influenced by the temperature rise of the working fluid as explained above. Thus, this form sufficiently enjoys the advantage obtained by prohibiting the operation of the motor pump in the high-temperature situation.

(8) The steering assist system according to any one of the forms (1) through (7), wherein the vehicle is a hybrid vehicle configured to be capable of being driven by both of the engine and a drive motor, and the vehicle is capable of being driven only by the drive motor, and wherein, when the vehicle is being driven only by the drive motor, the motor-pump controller controls the motor-pump ejection flow rate so as to permit the assist device to receive the working fluid at a flow rate lower than or equal to the required receiving flow rate.

(9) The steering assist system according to the form (8), wherein, when the vehicle is being driven only by the drive motor, the motor-pump controller controls the motor-pump ejection flow rate so as to permit the assist device to receive the working fluid at a flow rate equal to the required receiving flow rate.

The above two forms limit the operation of the motor pump in the EV mode. In both forms, the assist three that depends on the working fluid ejected from the motor pump is obtained in the state in which the engine pump is not operating. It is not necessarily required to cover the entirety of the required receiving flow rate by the motor-pump ejection flow rate when consideration is given to downsizing of the electric motor and the motor pump. According to the latter form, the entirety of the required receiving flow rate is covered by the motor-pump ejection flow rate, so that a sufficient assist force can be obtained even in the running of the vehicle in the EV mode.

(10) The steering assist system according to any one of the forms (1) through (9), further comprising an engine-pump ejection flow rate controller configured to electronically control the engine-pump ejection flow rate, the engine-pump ejection flow rate controller being disposed in series with the flow-rate restricting mechanism between the engine pump and the assist device or functioning also as the flow-rate restricting mechanism.

The engine-pump ejection flow rate controller according to this form may employ an electromagnetic valve mechanism having a known ordinary structure as illustrated in FIG. 2 of the Japanese Patent Application Publication No. 2014-19290, for instance. The controller is configured to control an electric current supplied to a solenoid so as to permit the working, fluid to pass therethrough at a flow rate in accordance with the controlled electric current. This form offers an advantage of preventing a rapid change in the flow rate of the working fluid ejected to the assist device when the running mode of the vehicle is switched from the EV mode to a mode in which the vehicle runs by driving of the engine (hereinafter referred to as "engine mode" where appropriate) or to a mode in which the vehicle runs by driving of both of the drive motor and the engine (hereinafter referred to as "hybrid mode" where appropriate). In this form, the engine-pump ejection flow rate controller may be disposed together with or instead of the flow-rate restricting mechanism explained above.

(11) The steering assist system according to the form (10), wherein the engine-pump ejection flow rate controller is configured to control, the engine-pump ejection flow rate to be lower than the required receiving flow rate over an entire range of the rotational speed of the engine in which the rotational speed of the engine is higher than or equal to the idling speed.

According to this form, at least a part of the insufficient flow rate caused due to the decrease in the engine-pump ejection flow rate is covered by the motor-pump ejection flow rate even when the vehicle is driven by the engine. Conversely, this form sufficiently contributes to a reduction in the pump capacity and the energy consumption of the engine pump.

BRIEF DESCRIPTION OF THE DRAWINGS

The objects, features, advantages, and technical and industrial significance of the present disclosure will be better understood by reading the following detailed description of an embodiment, when considered in connection with the accompanying drawings, in which.

DETAILED DESCRIPTION OF THE EMBODIMENT

A steering assist system according to one embodiment of the present disclosure will now be explained in detail with reference to the drawings. It is to be understood that the disclosure is not limited to the details of the following embodiment but may be changed and modified based on the knowledge of those skilled in the art.

[A] Structure of Vehicle on Which Steering Assist System is Installed

Figure 1:
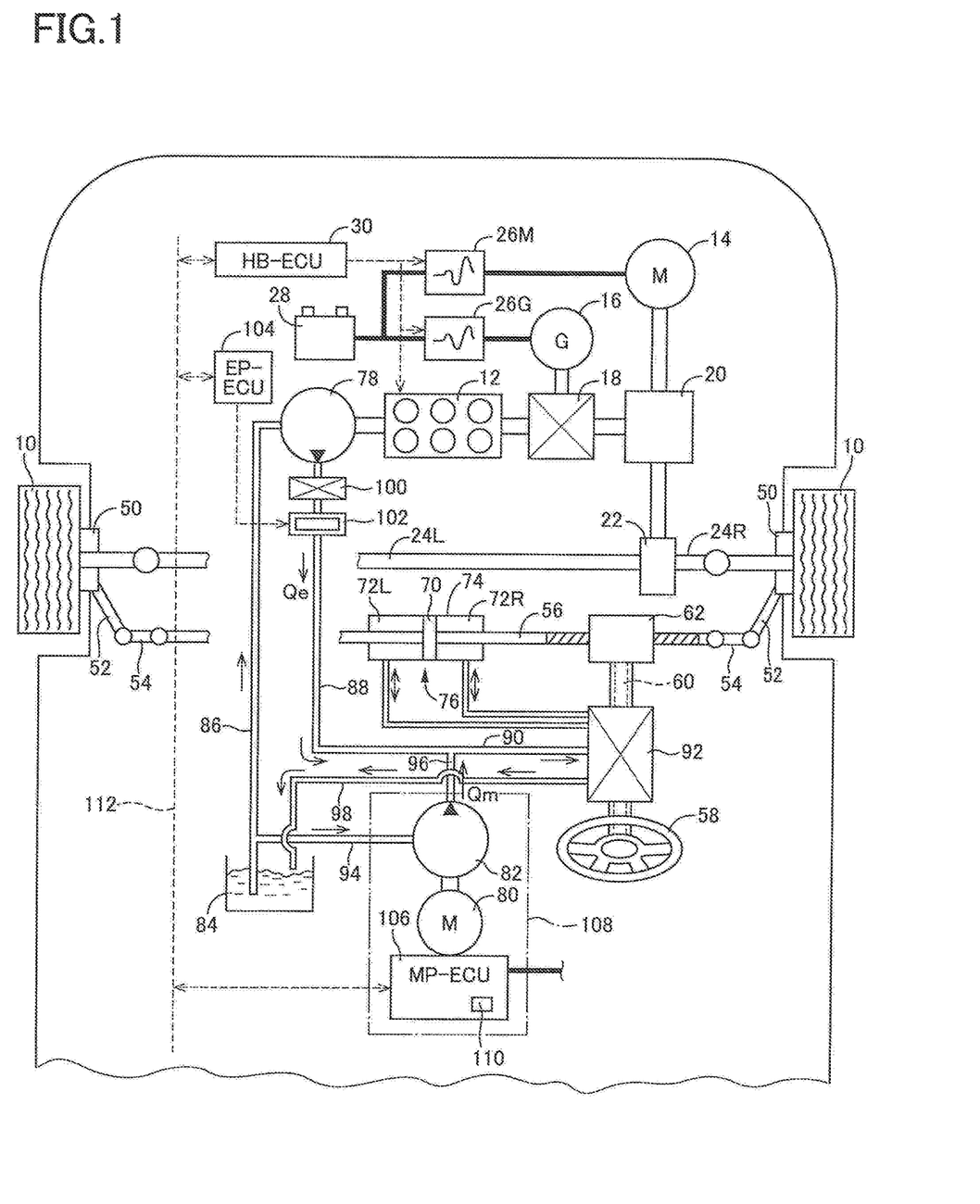
FIG. 1 is a view schematically illustrating an overall structure of a steering assist system according to one embodiment and a vehicle on which the steering assist system is installed.

As shown in FIG. 1, a vehicle on which a steering assist system according to the present embodiment is installed has four wheels 10, namely, front right and left wheels and rear right and left wheels. In FIG. 1, the two rear wheels are not illustrated. The two front wheels 10 are drive wheels. The vehicle is a hybrid vehicle whose front wheels 10 can be driven by both of an engine 12 and a drive motor 14 as an electric motor. The front wheels 10 are steerable wheels. In the following description, the steering assist system will be simply referred to as "assist system" where appropriate.

A vehicle drive system will be first explained. The vehicle drive system includes the engine 12, the drive motor 14, a generator 16 that functions mainly as an electric generator, and a power-distribution mechanism 18 to which the engine 12 and the generator 16 are coupled. The power-distribution mechanism 18 has a function of distributing rotation of the engine 12 to rotation of the generator 16 and rotation of an output shaft. The drive motor 14 is coupled to the output shaft via a reduction mechanism 20 functioning as a speed reducer. The rotation of the output shaft is transmitted to the front right and left wheels 10 via a differential mechanism 22 and respective drive shafts 24L, 24R, so that the front right and left wheels 10 are drivingly rotated. The generator 16 is coupled to a battery 28 via an inverter 26G. Electric energy obtained by electric power generation of the generator 16 is stored in the battery 28. The drive motor 14 is coupled to the battery 28 via an inverter 26M. The drive motor 14 and the generator 16 are controlled by controlling the inverter 26M and the inverter 26G, respectively. The vehicle drive system is controlled by an electronic control unit for hybrid driving (hereinafter abbreviated as "HB-ECU" where appropriate) 30. Depending upon the circumstances, the HB-ECU 30 selectively establishes, as a running mode of the vehicle, one of an engine mode in which the vehicle is driven only by the engine 12, an EV mode in which the vehicle is driven only by the electric motor 14, and a hybrid mode in which the vehicle is driven by both of the engine 12 and the electric motor 14.

The vehicle steering system will now be explained. The vehicle steering system includes: a pair of steering knuckles (hereinafter each simply referred to as "knuckle" where appropriate) 50 respectively holding the front right and left wheels 10; a steering rod 56 extending, in the right-left direction and connected at opposite ends thereof to knuckle arms 52 of the respective knuckles 50 via respective fie rods 54; a steering wheel 58 as a steering operation member; a steering shaft 60 held by a steering column and configured to rotate by a rotational operation of the steering wheel 58; and a gear box 62 that incorporates a motion converting mechanism (rack and pinion mechanism) for converting the rotation of the steering shaft 60 into a movement of the steering rod 56 in the right-left direction. The front right and left wheels 10 are steered by the rotational operation of the steering wheel 58.

[B] Hardware Structure of Steering Assist System

The assist system according to the present embodiment is for assisting a steering force by which a driver steers the front wheels 10 owing to a pressure of the working fluid (working oil). The assist system includes a hydraulic actuator 76 including a piston 70 fixed to the steering rod 56 and a housing 74 whose interior is partitioned into two fluid chambers 72L, 72R by the piston 70. The assist system further includes two pumps, each as a high-pressure fluid source, i.e., an engine pump 78 configured to be driven by the engine 12 and a motor pump 82 configured to be driven by an electric motor 80. The engine pump 78 pumps up the working fluid out of a reservoir 84 storing the working fluid via a first pump-up passage 86 and ejects the pumped working fluid to a supply-flow controlling mechanism 92 (which will be described) via a first ejection passage 88 and a common ejection passage 90. The motor pump 82 pumps up the working fluid out of the reservoir 84 via, a second pump-up passage 94 and ejects the pumped working fluid to the supply-flow controlling mechanism 92 via a second ejection passage 96 and the common ejection passage 90.

The supply-flow controlling mechanism 92 has a known ordinary structure as illustrated in FIG. 2 of the Japanese Patent Application Publication No. 6-8840, for instance. Specifically, the supply-flow controlling mechanism 92 has a function of controlling the flow rate of the working fluid to be supplied to the actuator 76 and a function of determining to which one of the two fluid chambers 72L, 72R the working fluid is to be supplied, based on a twisted amount of a torsion bar in accordance with the steering force by the driver and a steering direction, for instance. The supply-flow controlling mechanism 92 is configured to receive the working fluid ejected from at least one of the engine pump 78 and the motor pump 82. When the steering force is not being generated, the supply-flow controlling mechanism 92 permits the received working fluid to return to the reservoir 84 via a return passage 98. That is, the working fluid is circulated. When the steering force is being generated, on the other hand, the supply-flow controlling mechanism 92 supplies at least a part of the received working fluid to one of the two fluid chambers 72L, 72R of the actuator 76 at a flow rate in accordance with the steering and receives, from the other of the two fluid chambers 72L, 72R, the working fluid at the same flow late as the supplied working fluid. The supply-flow controlling mechanism 92 permits the working fluid received from the other of the two fluid chambers 72L, 72R also to return to the reservoir 84. In the actuator 76, a force in accordance with the pressure of the working fluid supplied from the supply-flow controlling mechanism 92 to the one of the two fluid chambers 72L, 72R acts on the piston 70, so that the steering force is assisted by the force, i.e., an assist force. In the present assist system, the supply-flow controlling mechanism 92 and the actuator 76 constitute an assist device configured to assist the steering force by the received working fluid while permitting the received working fluid to return to the reservoir 84.

The engine pump 78 is configured to eject the working fluid at a flow rate in, accordance with a rotational speed of the engine 12. The assist system is provided with a flow-rate restricting mechanism 100 disposed on an ejection side of the engine pump 78 for restricting the flow rate of the working fluid ejected from the engine pump 78. The flow-rate restricting mechanism 100 has a known ordinary structure including valves, as described in the Japanese Patent No. 3218788, Japanese Patent Application Publication No. 8-301132, or the Japanese Patent Application Publication No. 6-8840, for instance. Specifically, the flow-rate restricting mechanism 100 has a function of restricting, to a set flow rate, the flow rate of the working fluid to be supplied to the supply-flow controlling mechanism 92 after passing therethrough, in the case where the rotational speed of the engine 12 becomes high to a certain extent. Further, the assist system is provided with an engine-pump ejection flow rate controlling mechanism 102 disposed on an ejection side of the flow-rate restricting mechanism 100 so as to be in series therewith and configured to control the flow rate of the working fluid to be sent from the flow-rate restricting mechanism 100 to the supply-flow controlling mechanism 92. The engine-pump ejection flow rate controlling mechanism 102 has a known ordinary electromagnetic valve structure as illustrated in FIG. 2 of the Japanese Patent Application Publication No. 2014-19290, for instance. The engine-pump ejection flow rate controlling mechanism 102 has a function of allowing passage of the working fluid at a flow rate in accordance with an electric current supplied to a solenoid. The engine-wrap ejection flow rate controlling mechanism 102 is controlled by an electronic control unit for the engine-pump ejection flow rate (hereinafter referred to as "EP-ECU" where appropriate) 104. It may be considered that the engine-pump ejection flow rate controlling mechanism 102 and the EP-ECU 104 constitute an engine-pump ejection flow rate controller. The flow rate of the working fluid ejected from the engine pump 78 to the supply-flow controlling mechanism 92 will be hereinafter referred to as an engine-pump ejection flow rate Qe. The engine-pump ejection flow rate controller has a function of electronically controlling the engine-pump ejection flow rate Qe.

Control of the motor pump 82, specifically, control of the operation of the electric motor 80 that drives the motor pump 82, is executed by an electronic control unit for the motor pump (hereinafter referred to as "MP-ECU" where appropriate) 106, as a motor-pump controller. The flow rate of the working fluid ejected from the motor pump 82 to the supply-flow controlling mechanism 92 will be hereinafter referred to as a motor-pump ejection flow rate Qm. The MP-ECU 106 has a function of electronically controlling the motor-pump ejection flow rate Qm. The motor pump 82, the electric motor 80, and the MP-ECU 106 are formed as a unit and installed on the vehicle as a motor pump unit 108, thus enhancing installation efficiency of the motor pump 82, the electric motor 80, and the MP-ECU 106. The MP-ECU 106 includes a temperature sensor 110 incorporated therein.

The EP-ECU 104, the MP-ECU 106, and the HB-ECU 30 explained above are connected to a car area network or controllable area network (CAN) 112 and configured to execute a cooperative control process while performing communication with one another.

[C] Operation of Steering Assist System i) Operation in Normal Condition

Figure 2:
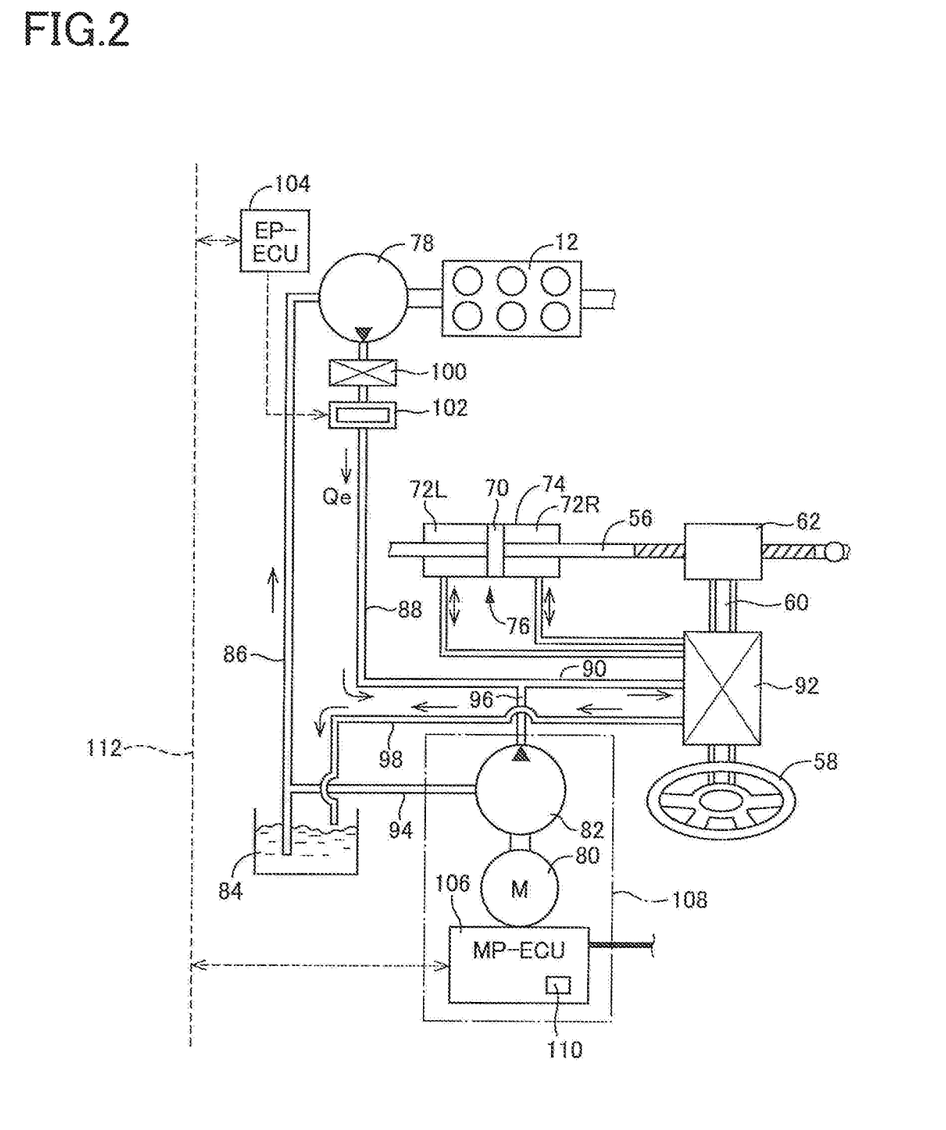
FIG. 2 is a view illustrating a state of the steering assist system in which a working fluid is ejected to an assist device only from an engine pump.
Figure 3:
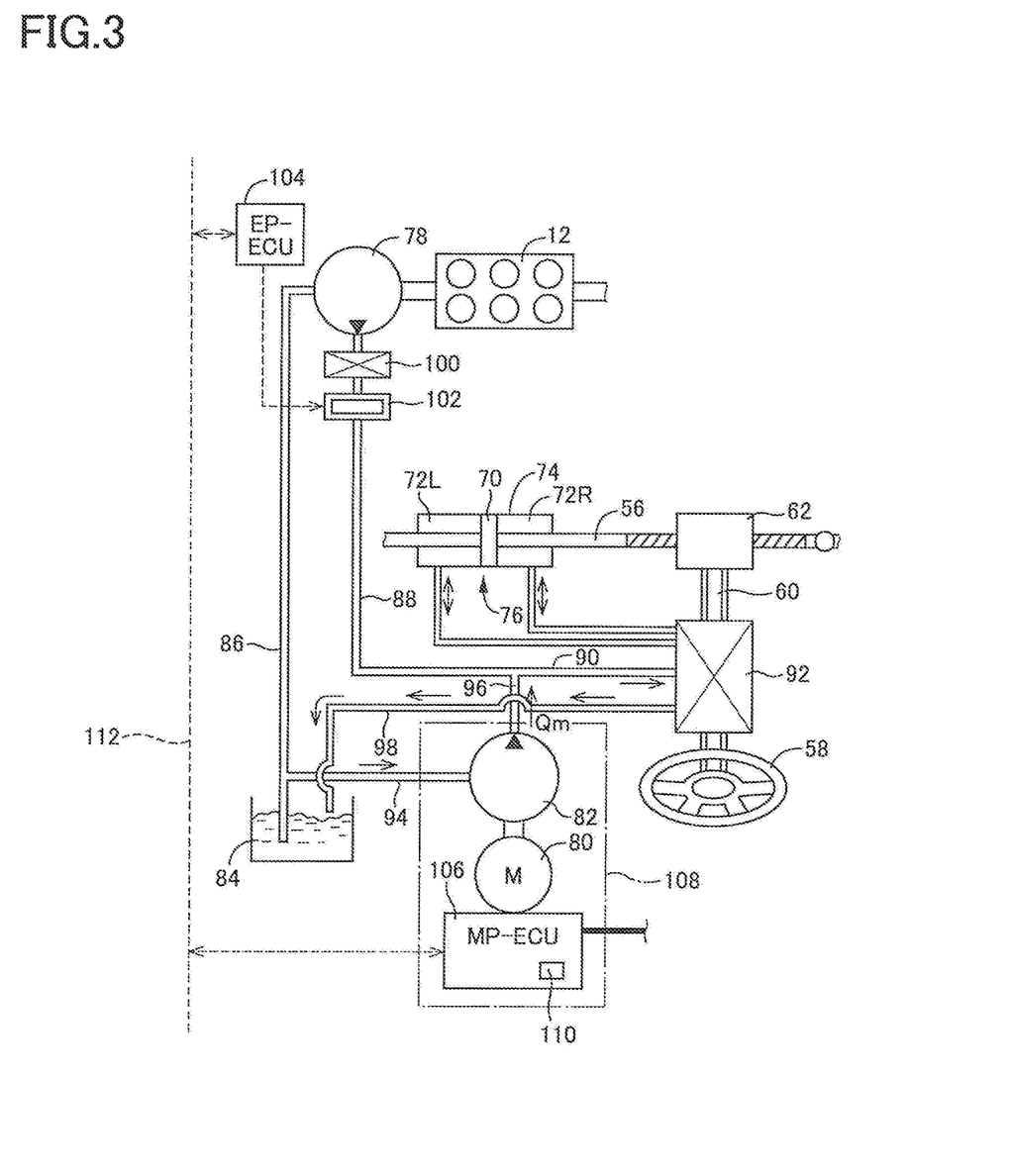
FIG. 3 is a view illustrating a state of the steering assist system in which the working fluid is ejected to the assist device only from the motor pump.

FIG. 1 shows a state of the assist system in which the working fluid is ejected to the supply-flow controlling mechanism 92 from both of the engine pump 78 and the motor pump 82. An operation mode of the assist system in this state will be hereinafter referred to as a bi-pump mode. FIGS. 2 and 3, in each of which only the assist system is illustrated, respectively show a gate in which the working fluid is ejected to the supply-flow controlling mechanism 92 only front the engine pump 78 and a state in which the working fluid is ejected to the supply-flow controlling mechanism 92 only from the motor pump 82. The operation mode shown in the state of FIG. 2 will be hereinafter referred to as an engine-pump mode, and the operation mode shown in the state of FIG. 3 will be hereinafter referred to as a motor-pump mode.

Figure 4A:
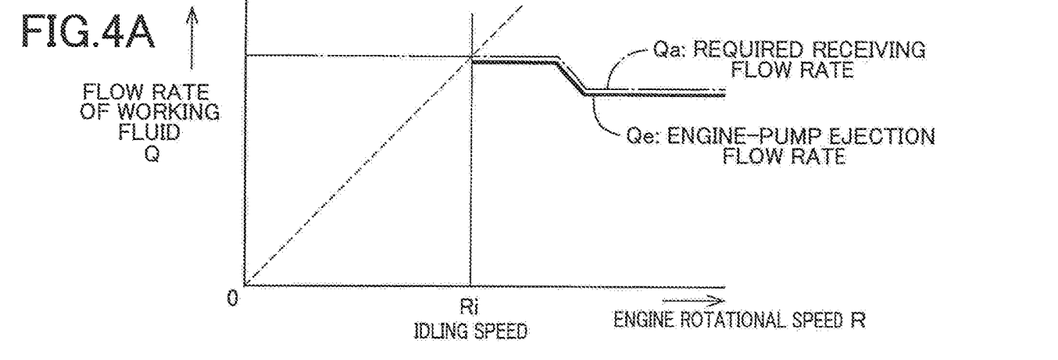
FIG. 4A is a graph for explaining an operation of the steering assist system in a normal condition.

There will be explained an operation conventionally executed in the engine-pump mode. As indicated by the dashed line in a graph of FIG. 4A, the ejection flow rate of the working fluid ejected from the engine pump 78 substantially linearly increases with an increase in a rotational speed R of the engine 12. In the interest of simplification of explanation, a case is considered in which the engine-pump ejection flow rate controlling mechanism 102 is not operated, namely, the engine-pump ejection flow rate Qe is restricted only by the flow-rate restricting mechanism 100. For instance, the flow-rate restricting mechanism 100 may be adjusted such that the engine-pump ejection flow rate Qe is restricted as indicated by the long dashed short dashed line in the graph of FIG. 4A. The flow rate of the working fluid which is required to be received by the supply-flow controlling mechanism 92, i.e., a required receiving flow rate Qa, is set in the present assist system. The graph of FIG. 4A shows an instance in which the flow-rate restricting mechanism 100 is adjusted such that the engine-pump ejection flow rate Qe is equal to the required receiving flow rate Qa. That is, the long dashed short dashed line in the graph may be regarded as a line indicating the required receiving flow rate Qa. It is noted that the required receiving flow rate Qa becomes smaller when the rotational speed R of the engine 12 is increased to a certain extent. This is because for increasing a load with respect to the steering operation, namely, for increasing a force required for the steering operation, when the vehicle is running at a high speed to a certain extent. According to the thus constructed engine pump 78 and flow-rate restricting mechanism 100 the working fluid is ejected to the supply-flow controlling mechanism 92 at the engine-pump ejection flow rate Qe indicated by the solid line. The engine 12 is rotated at a speed higher than or equal to the set idling speed Ri. Thus, there is no solid line, in the graph, that indicates the engine-pump ejection flow, rate Qe in a region of the engine rotational speed lower than the idling speed Ri.

The present assist system employs the engine pump 78 having a relatively small size, namely, a relatively small ejection capacity with a small ejection amount per one rotation, for improving the fuel economy and reducing the load torque, for instance. Accordingly, as indicated by the dashed line in a graph of FIG. 4B, the ejection flow rate of the working fluid from the engine pump 78 is smaller than that in the graph of FIG. 4A. In the present assist system, therefore, there is caused an insufficient flow rate Qi (indicated as a hatched region in the graph of FIG. 4B), namely, there is caused a shortage in the required receiving flow rate Qa that cannot be covered by the engine-pump ejection flow rate Qe, in a region $\Delta R$ (FIG. 4B) in which the rotational speed R of the engine 12 is relatively low (hereinafter referred to as "low rotational speed region $\Delta R$ where appropriate). The present assist system is configured to cover the insufficient flow rate Qi by the motor-pump ejection flow rate Qm which is the flow rate of the working fluid ejected from the motor pump 82 to the supply-flow controlling mechanism 92. Specifically, when the vehicle is running in the engine mode or the hybrid mode, the motor pump 82 is controlled by the MP-ECU 106 such that the motor-pump ejection flow rate Qm becomes equal to the insufficient flow rate Qi in the low rotational speed region $\Delta R$. That is, the assist system is operated in the bi-pump mode.

In the present assist system, the engine-pump ejection flow rate controlling mechanism 102 is also operated by being controlled by the EP-ECU 104, so that the engine-pump ejection flow rate Qe is further restricted. Specifically, the engine-pump ejection flow rate Qe is made smaller, as indicated by the solid line in a graph of FIG. 4C. Thus, the insufficient flow rate Qi is caused not only in the low rotational speed region $\Delta R$, but also over the entire region of the rotational speed R in which the engine 12 operates. Over the entire region, the assist system operates in the bi-pump mode, and the insufficient flow rate Qi is covered by the motor-pump ejection flow rate Qm. In other words, the engine-pump ejection flow rate controller controls, over the entire region in which the rotational speed R of the engine 12 is higher than or equal to the idling speed Ri, the engine-pump ejection flow rate Qe so as to be lower than the required receiving flow rate Qa.

When the running mode of the vehicle is the EV mode, the engine 12 is not operating. In this case, the assist system operates in the motor-pump mode, and the motor pump 82 is controlled by the MP-ECU 106 such that the entirety of the required receiving flow rate Qa is covered by the motor-pump ejection flow rate Qm.

ii) Problems in High-Temperature Situation and Measures for Addressing Problems

The engine pump 78 keeps operating when the vehicle is running in the engine mode or the hybrid mode, and the working fluid is always circulating. The operation of the engine pump 78 is a cause of the temperature rise of the working fluid. Moreover, the working fluid ejected from the engine pump 78 passes through the flow-rate restricting mechanism 100, and the passage of the working fluid through the flow-rate restricting mechanism 100 is a big factor responsible for the temperature rise of the working fluid. Due to the temperature rise of the working fluid, the assist system is placed in the high-temperature situation. The temperature of the working fluid does not largely increases in normal running or normal steering. There is, however, a high possibility that the temperature of the working fluid becomes in the case where a severe operation of the vehicle is made, e.g., in the case where the vehicle is operated such that the steering wheel 58 is kept operated at the steering end while the engine 12 is kept rotated at a high rotational speed. In this respect, even if the temperature of the working fluid once becomes high, the temperature gradually decreases when the vehicle returns to the normal running or the normal steering.

On the other hand, the operable temperature range of the electric motor 80 configured to drive the motor pump 82 is lower than that of the engine pump 78. The MP-ECU 106 is constituted by an electronic board on which the computer, the drivers, etc., are mounted, and its operable temperature range is low. In the present assist system, the electric motor 80, the motor pump 82, and the MP-ECU 106 are formed as a unit and installed on the vehicle as the motor pump unit 108. Accordingly, the electric motor 80 and the MP-ECU 106 are likely to be largely influenced by the heat transmitted from the working fluid.

In view of the above, the present assist system is configured to prohibit the motor pump 82 from operating when the vehicle is placed in the high-temperature situation. Specifically, when a temperature T detected by the temperature sensor 110 incorporated in the MP-ECU 106 becomes higher than or equal to a first set temperature T1, it is estimated that the temperature of the working fluid is higher than or equal to the set temperature. In this case, the MP-ECU 106 prohibits the operation of the motor pump 82. When the temperature of the working fluid decreases thereafter and becomes lower than or equal to a second set temperature T2 in a state in which the operation of the motor pump 82 is prohibited, the prohibited operation of the motor pump 82 is allowed. To prevent an occurrence of the hunting phenomenon in control, the second set temperature T2 is set to be lower than the first set temperature T1 by providing a suitable margin ΔT.

Figure 4B:
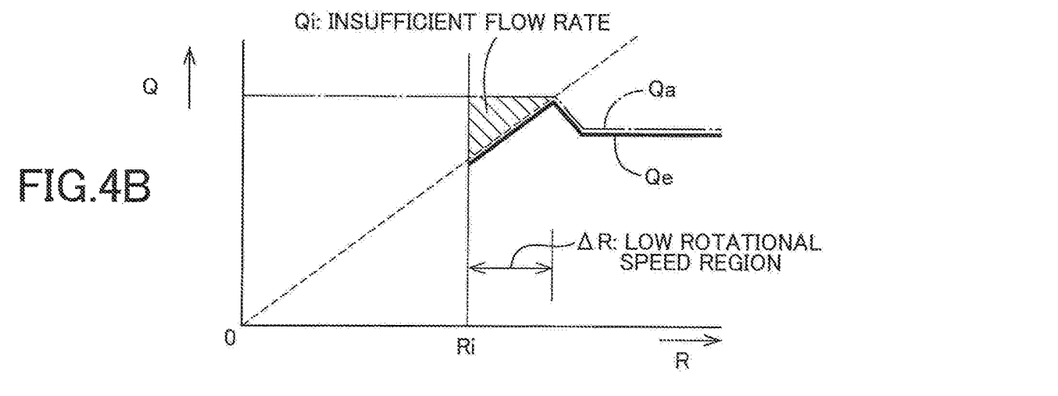
FIG. 4B is a graph for explaining an operation of the steering assist system in a normal condition.
Figure 4C:
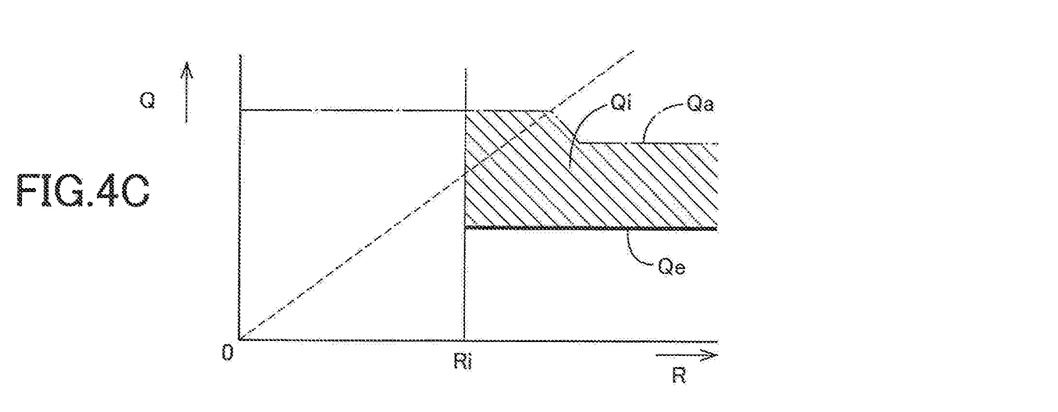
FIG. 4C is a graph for explaining an operation of the steering assist system in a normal condition.
Figure 5:
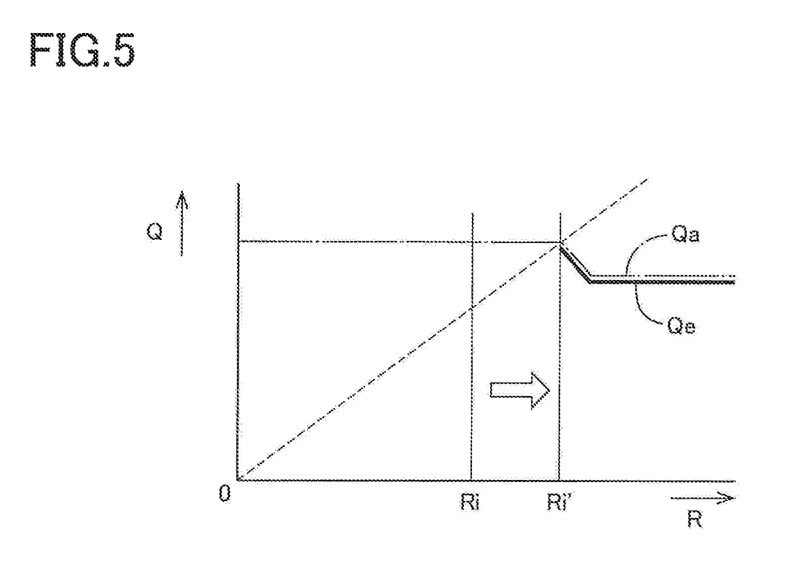
FIG. 5 is a graph for explaining an operation of the steering assist system in a state in which the motor pump is prohibited from operating.

In the state in which the operation of the motor pump 82 is prohibited, the engine-pump ejection flow rate Qe is not enough to cover the required receiving flow rate Qa, as apparent from the graphs of FIGS. 4B and 4C. That is, the insufficient flow rate Qi is not compensated for. As shown in FIG. 5, the present assist system is configured to stop the control of the engine-pump ejection flow rate controlling mechanism 102 executed by the EP-ECU 104, namely, to cancel the restriction of the engine-pump ejection flow rate Qe by the engine-pump ejection flow rate controlling mechanism 102, and to change the idling speed Ri of the engine 12 to an idling speed Ri' higher than the idling speed Ri. Specifically, the MP-ECU 106 transmits, to the HE-ECU 30, a command to operate the engine 12 at the idling speed Ri', and the HB-ECU 30 accordingly controls the engine 12 at the idling speed Ri'. In this respect, for allowing the operation of the motor pump 82 that has been prohibited, the EP-ECU 104 restarts controlling the engine-pump ejection flow rate controlling mechanism 102, and the MP-ECU 106 transmits, to the HB-ECU 30, a command to operate the engine 12 at the idling speed Ri, so that the HB-ECU 30 controls the engine 12 to operate at the idling speed Ri.

The higher idling speed Ri' is set to a speed at which the low rotational speed region ΔR in the graph of FIG. 4B does not exist. Owing to the change of the engine idling speed from the speed Ri to the speed Ri', the required receiving flow rate Qa is covered only by the engine-pump ejection flow rate Qe over the entire region of the rotational speed R in which the engine 12 operates. That is, even when the operation of the motor pump 82 is prohibited in the high-temperature situation, a sufficient assist force is obtained in the engine mode or the hybrid mode.

In the state in which the operation of the motor pump 82 is prohibited, the MP-ECU 106 transmits, to the HB-ECU 30, a command to prohibit running of the vehicle in the EV mode, so as to prohibit running in the EV mode.

iii) Control Flow of Steering Assist System

Figure 6:
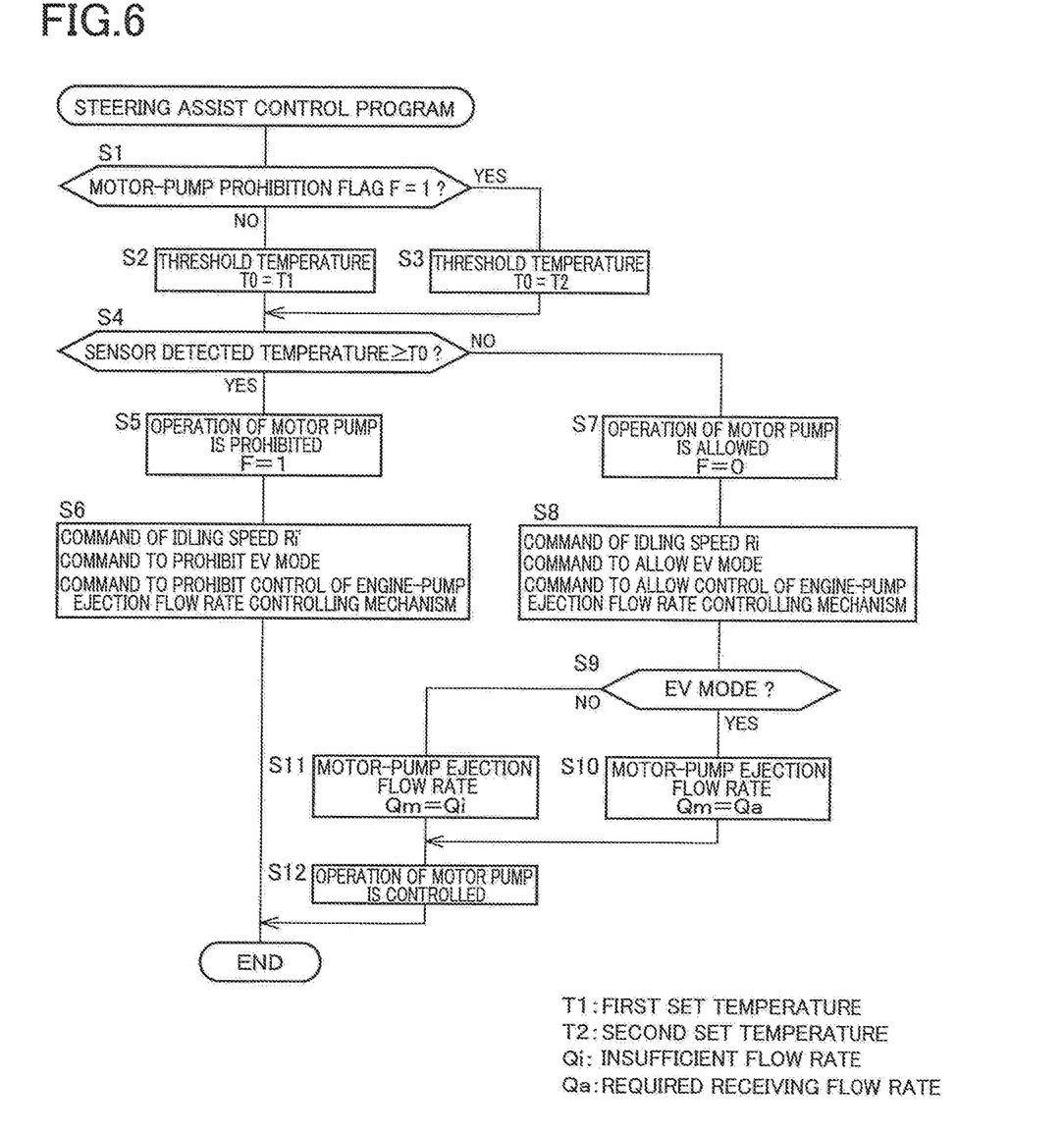
FIG. 6 is a flowchart indicating a steering assist control program executed in the steering assist system.

The control of the present assist system that focuses on the control as to the prohibition of the operation of the motor pump 82 in the high-temperature situation is executed such that the MP-ECU 106 functioning as a main controller of the assist system executes a steering assist control program indicated by a flowchart of FIG. 6 at a short time pitch, e.g., from several to several tens of milliseconds (msec). There will be briefly explained a control flow of the program.

In the process according to the control program, Step 1 is implemented to confirm a flag value of a motor-pump prohibition flag F. (Hereinafter, Step 1 is abbreviated as "S1". Other steps are similarly abbreviated.) The flag value of the motor-pump prohibition flag F is "1" in the case where the operation of the motor pump 82 is prohibited and is "0" in the case where the operation of the motor pump 82 is allowed. When the flag value is "0", S2 is implemented to set, to the first set temperature T1, a threshold temperature T0 for determining whether to prohibit or allow the operation of the motor pump 82. When the flag value is "1", S3 is implemented to set the threshold temperature T0 to the second set temperature T2.

At S4, it is determined whether or not the temperature T detected by the temperature sensor 110 is higher than or equal to the threshold temperature T0. When it is determined that the temperature T is higher than or equal to the threshold temperature T0, S5 is implemented to prohibit the operation of the motor pump 82 and set the flag value of the motor-pump prohibition flag F to "1". At S6, the command to operate the engine 12 at the higher idling speed Ri' and the command to prohibit running of the vehicle in the EV mode are transmitted to the HB-ECU 30, and the command to prohibit the control of the engine-pump ejection flow rate controlling mechanism 102 is transmitted to the EP-ECU 104. As explained above, in the case where the operation of the motor pump 82 is prohibited, the control of the engine-pump ejection flow rate Qe by the engine-pump ejection flow rate controlling mechanism 102 is not executed.

When it is determined at S4 that the temperature T detected by the temperature sensor 110 is less than the threshold temperature T0, S7 is implemented to allow the operation of the motor pump 82 and set the flag value of the motor-pump prohibition flag F to "0". At S8, the command to operate the engine 12 at the normal idling speed Ri and the command to allow running of the vehicle in the EV mode are transmitted to the HB-ECU 30, and the command to allow the control of the engine-pump ejection flow rate controlling mechanism 102 is transmitted to the EP-ECU 104. It is determined at S9 whether or not the vehicle is running in the EV mode. When the vehicle is running in the EV mode, the motor-pump ejection flow rate Qm is determined to be equal to the required receiving flow rate Qa at S10. When the vehicle is not running in the EV mode, the motor-pump ejection flow rate Qm is determined to be equal to the insufficient flow rate Qi at S11. At S12, the operation of the motor pump 82 is controlled based on the determined motor-pump ejection flow rate Qm.

[D] Modification

The assist system in the illustrated embodiment includes, for electronically controlling the engine-pump ejection flow rate Qe, the engine-pump ejection now rate controlling mechanism 102 and the EP-ECU 104. An assist system not including the mechanism 102 and the EP-ECU 104 may be constructed. Such an assist system is inexpensive in cost. This assist system operates as shown in the graph of FIG. 4B when the operation of the motor pump 82 is allowed and operates as shown in the graph of FIG. 5 when the operation of the motor pump 82 is prohibited. Like the assist system in the illustrated embodiment, this assist system enjoys the advantages offered by prohibiting the operation of the motor pump 82 in the high-temperature situation.

The assist system may be configured to operate as shown in the graph of FIG. 4C only by the engine-pump ejection flow rate controlling mechanism 102 without including the flow-rate restricting mechanism 100.

What is claimed is:

1. A steering assist system for a vehicle, comprising:
a reservoir storing a working fluid;
an engine pump configured to be driven by an engine that drives the vehicle and to pump up the working fluid stored in the reservoir so as to eject the working fluid at a flow rate in accordance with a rotational speed of the engine;
a flow-rate restricting mechanism configured to restrict the flow rate of the working fluid ejected from the engine pump;
an electric motor;
a motor pump configured to be driven by the electric motor and to pump up the working fluid stored in the reservoir so as to eject the working fluid;
a motor-pump controller configured to control a motor-pump ejection flow rate by controlling an operation of the electric motor, the motor-pump ejection flow rate being a flow rate of the working fluid ejected from the motor pump; and
an assist device configured to receive the working fluid ejected from the motor pump and the working fluid ejected from the engine pump via the flow-rate restricting mechanism and to assist a steering force by the received working fluid while returning the received working fluid to the reservoir,
wherein the steering assist system is configured such that an engine-pump ejection flow rate is restricted to be lower than a required receiving flow rate when the engine pump is operated by being driven by the engine that is rotating at an idling speed, the engine-pump ejection flow rate being a flow rate of the working fluid ejected from the engine pump to the assist device via the flow-rate restricting mechanism, the required receiving flow rate being a flow rate of the working fluid required to be received by the assist device, and
wherein the motor-pump controller is configured to control the motor-pump ejection flow rate such that an insufficient flow rate of the working fluid is covered by the motor-pump ejection flow rate, the insufficient flow rate being a shortage in the required receiving flow rate that cannot be covered by the engine-pump ejection flow rate.

2. The steering assist system according to claim 1, wherein the motor-pump controller is configured to prohibit ejection of the working fluid from the motor pump in a situation in which a temperature of the working fluid is higher than or equal to a set temperature.

3. The steering assist system according to claim 2, wherein the idling speed of the engine is increased in the situation.

4. The steering assist system according to claim 3, wherein the idling speed of the engine is increased in the situation to such an extent that the required receiving flow rate is covered by the engine-pump ejection flow rate at a time when the engine pump is operated by being driven the engine that is rotating at the idling speed.

5. The steering assist system according to claim 2, wherein, where the set temperature is a first set temperature, the ejection of the working fluid front the motor pump that has been prohibited is allowed when the temperature of the working fluid is lowered to less than a second set temperature that is set to be lower than the first set temperature by providing a margin.

6. The steering assist system according to claim 2,
wherein the vehicle is a hybrid vehicle configured to be capable of being driven by both of the engine and a drive motor, and the vehicle is capable of being driven only by the drive motor, and
wherein the vehicle is prohibited from being driven only by the drive motor in the situation.

7. The steering assist system according to claim 1, wherein the electric motor, the motor pump, and the motor-pump controller are installed on the vehicle as a unit.

8. The steering assist system according to claim 1,
wherein the vehicle is a hybrid vehicle configured to be capable of being driven by both of the engine and a drive motor, and the vehicle is capable of being driven only by the drive motor, and
wherein, when the vehicle is being driven only by the drive motor, the motor-pump controller controls the motor-pump ejection flow rate so as to permit the assist device to receive the working fluid at a flow rate lower than or equal to the required receiving flow rate.

9. The steering assist system according to claim 8, wherein, when the vehicle is being driven only by the drive motor, the motor-pump controller controls the motor-pump ejection flow rate so as to permit the assist device to receive the working fluid at a flow rate equal to the required receiving flow rate.

10. The steering assist system according to claim 1, further comprising an engine-pump ejection flow rate controller configured to electronically control the engine-pump ejection flow rate, the engine-pump ejection flow rate controller being disposed in series with the flow-rate restricting mechanism between the engine pump and the assist device or functioning also as the flow-rate restricting mechanism.

11. The steering assist system according to claim 10, wherein the engine-pump ejection flow rate controller is configured to control the engine-pump ejection flow rate to be lower than the required receiving flow rate over an entire range of the rotational speed of the engine in which the rotational speed of the engine is higher than or equal to the idling speed.

\* \* \* \* \*

UNITED STATES PATENT AND TRADEMARK OFFICE
CERTIFICATE OF CORRECTION

PATENT NO. : 11,008,038 B2
APPLICATION NO. : 16/272355
DATED : May 18, 2021
INVENTOR(S) : Takeshi Nishida and Tsuyoshi Ikeda It is certified that error appears in the above-identified patent and that said Letters Patent is hereby corrected as shown below:

In the Specification

In Column 1, Line(s) 16, after "on", delete ",".

In Column 1, Line(s) 21, delete "three" and insert --force--, therefor.

In Column 1, Line(s) 47, after "Accordingly", insert --,--.

In Column 1, Line(s) 63, delete "hove" and insert --flow--, therefor.

In Column 2, Line(s) 10, after "understanding", delete ",".

In Column 2, Line(s) 13, delete "rations" and insert --various--, therefor.

In Column 3, Line(s) 2, delete "firm" and insert --form--, therefor.

In Column 3, Line(s) 17, after "utilizing", delete ",".

In Column 5, Line(s) 20, delete "arise" and insert --a rise--, therefor.

In Column 6, Line(s) 1, after "idling", delete ",".

In Column 6, Line(s) 6, after "to", delete "it" and insert --increase--, therefor.

In Column 7, Line(s) 34, delete "three" and insert --force--, therefor.

In Column 7, Line(s) 59, after "working", delete ",".

In Column 9, Line(s) 39, delete "fie" and insert --tie--, therefor.

Signed and Sealed this
Twentieth Day of July, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 11,008,038 B2

In Column 10, Line(s) 1, after "via", delete ",".

In Column 11, Line(s) 2, delete "engine-wrap" and insert --engine-pump--, therefor.

In Column 11, Line(s) 45, delete "gate" and insert --state--, therefor.

In Column 11, Line(s) 47, delete "front" and insert --from--, therefor.

In Column 12, Line(s) 16, after "100", insert --,--.

In Column 15, Line(s) 21, delete "now" and insert --flow--, therefor.